US006887344B1

(12) United States Patent
VanKouwenberg

(10) Patent No.: US 6,887,344 B1
(45) Date of Patent: May 3, 2005

(54) COMPACT WASTEWATER CLEANING APPARATUS

(76) Inventor: Raymond E. VanKouwenberg, 7 Sunleaf Dr., Penfield, NY (US) 14526

( * ) Notice: Subject to any disclaimer, the term of this patent is extended or adjusted under 35 U.S.C. 154(b) by 213 days.

(21) Appl. No.: 09/630,900

(22) Filed: Aug. 2, 2000

Related U.S. Application Data
(60) Provisional application No. 60/147,736, filed on Aug. 6, 1999, and provisional application No. 60/159,664, filed on Oct. 15, 1999.

(51) Int. Cl.[7] .............................. B01D 1/30; C02F 1/04
(52) U.S. Cl. ........................ 159/23; 159/28.1; 159/44; 159/DIG. 15; 159/DIG. 41; 202/83; 202/160; 202/176; 202/200; 202/206; 202/267.1; 203/2; 203/10; 203/86; 203/100
(58) Field of Search ........................ 159/23, 46, 27.3, 159/28.1, DIG. 15, DIG. 23, DIG. 32, DIG. 41, 44; 202/160, 200, 206, 267.1, 176, 83; 203/2, 10, 86, 100, DIG. 17

(56) References Cited

U.S. PATENT DOCUMENTS

| | | | | |
|---|---|---|---|---|
| 4,141,798 A | * | 2/1979 | Grosse | 202/234 |
| 4,600,474 A | * | 7/1986 | Korenowski | 159/38 |
| 5,348,623 A | * | 9/1994 | Salmon | 159/44 |
| 5,582,680 A | * | 12/1996 | Vankouwenberg et al. | 110/235 |
| 5,772,843 A | * | 6/1998 | Rhodes | 159/16.1 |
| 6,200,428 B1 | * | 3/2001 | VanKouwenberg | 110/238 |

FOREIGN PATENT DOCUMENTS

| | | | | |
|---|---|---|---|---|
| DE | 004314990 | * | 11/1994 | 159/47.3 |

OTHER PUBLICATIONS

Cress et al, Solar still for purifying water used for growth chamber and mite rearing. Trans.Kans. Acad. Sci.,81(40, 319–25, 1978.*

* cited by examiner

*Primary Examiner*—Virginia Manoharan
(74) *Attorney, Agent, or Firm*—Ronald S. Kareken; Hiscock & Barclay LLP

(57) ABSTRACT

A compact, self-contained apparatus for treating wastewater containing as impurities and pollutants various non-volatile (at water boiling points) fluids such as greases, oils and soaps, a vessel for collecting the wastewater, a heating chamber including electric heating elements and a heat transfer liquid such as mineral oil to heat the wastewater admixture to boil off the water and to reduce the volume of liquid for disposal, and a wastewater supply tank positioned under the apparatus. The apparatus may further include a disposable liner to isolate the wastewater from the vessel itself and facilitate rapid and clean removal and disposal of waste material after evaporation of the water, and thermally-activated sensors to maintain a desired temperature differential between the heating elements and the heat transfer liquid contained in the apparatus.

17 Claims, 5 Drawing Sheets

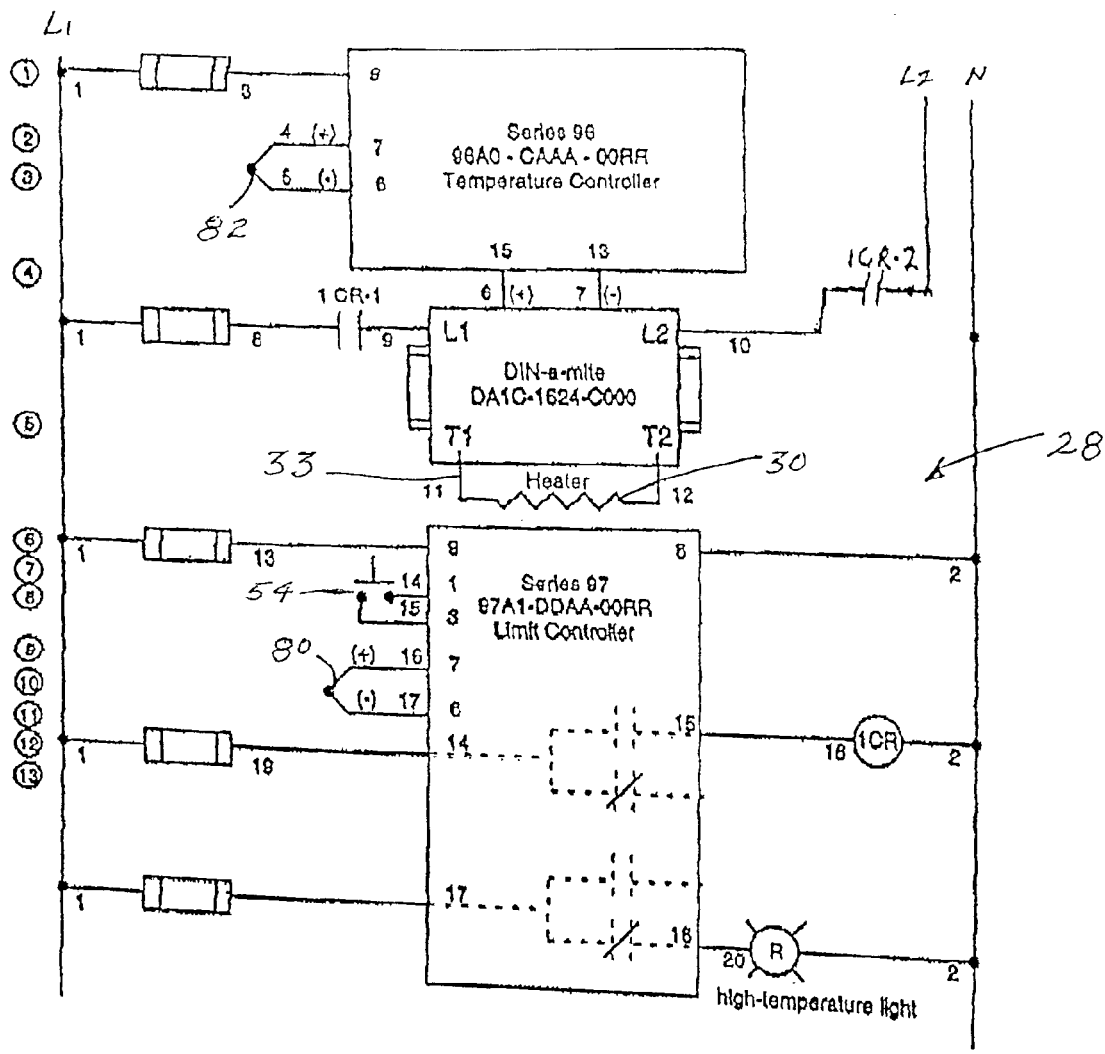

US 6,887,344 B1

COMPACT WASTEWATER CLEANING APPARATUS

PRIOR APPLICATIONS

This application is based on and claims the benefit of the filing dates of U.S. Provisional Patent Applications Ser. No. 60/147,736, filed Aug. 6, 1999, and Ser. No. 60/159,664, filed Oct. 15, 1999, both entitled *Compact Wastewater Cleaning Apparatus* ("the co-pending provisional applications"), the entire disclosures of which are incorporated by reference into this application.

FIELD OF INVENTION

This application relates to apparatus for the treatment of wastewater resulting from cleaning of, for example, buildings, vehicles and machinery by reducing the volume of wastewater required for disposal by an efficient water evaporation.

BACKGROUND OF INVENTION

As explained in my U.S. Pat. No. 5,582,680, and in my U.S. Pat. No. 6,200,428, filed Mar. 31, 1998, the entire disclosures of which are incorporated by reference into this application, good manufacturing processes, concern for the environment, and changes in environmental practices and regulations all have created additional needs in handling waste fluids after manufacturing and cleaning operations, especially in disposing of water based mixtures containing pollutants such as greases, oils, soaps, heavy metals, road film and carcinogens. Whereas in the past it was acceptable merely to dump such waste liquids in the ground or in sewer systems, current good practices and environmental laws and regulations now severely discourage and/or prohibit such practices. Although very laudable in intent, the result can be very costly, especially to businesses who must use substantial quantities of water in their operations, as for example to clean buildings, vehicles and other machines, which will result in wastewater containing greases, oils, minute metallic and other particles, and detergents. Each of the aforementioned patent and co-pending application describes and claims an apparatus operated on the evaporation principle and which is relatively inexpensive to manufacture, simple and safe to operate, and relatively more efficient in the active removal of non-volatile fluids and contaminants from wastewater. I now have invented an improvement to such apparatus which is compact and especially useful in the treatment and reduction of wash and rinse water resulting from the cleaning and or mopping of buildings, vehicles and machinery, including especially the large amounts of wastewater generated by cleaning large areas of high trafficked floors in commercial and industrial facilities using power scrubbing equipment.

The apparatus is compact and easily moved within a facility, and it uses an environmentally safe heat transfer fluid and an optional disposable liner to contain the wastes remaining after evaporation.

SUMMARY OF THE INVENTION

In accordance with this invention, there is provided a novel wastewater treatment apparatus that treats wastewater containing, as impurities and pollutants, various non-volatile (at water boiling points) fluids such as greases, oils, carcinogens and detergents, by vaporizing the water, using electrical heating elements and a heat transferring mineral oil by which heat transfer is effected and in which the outer surfaces of the apparatus remain essentially cool to the touch even while in operation.

Further features of the invention include a special liner in the wastewater receiving vessel of the apparatus to isolate the wastewater from the vessel itself and facilitate rapid and clean removal and disposal of waste material after evaporation of the water, and paired thermally-activated sensors or temperature probes to control the electrical current to the heating elements, one of which probes measures and responds to the temperature of the heat transferring mineral oil and the other of which measures and responds to the surface temperature of the electrical heating elements.

BRIEF DESCRIPTION OF THE DRAWINGS

The present invention will be more fully understood by reference to the following detailed description of a preferred embodiment and the attached drawings, in which like reference numerals refer to like elements, and wherein:

FIG. 8 shows an exemplary diagram of an electrical circuit to detect and react appropriately to the varying differences in temperature between the heating elements and the heating fluid in which they are immersed.

DESCRIPTION OF THE PREFERRED EMBODIMENTS

Figure 1:
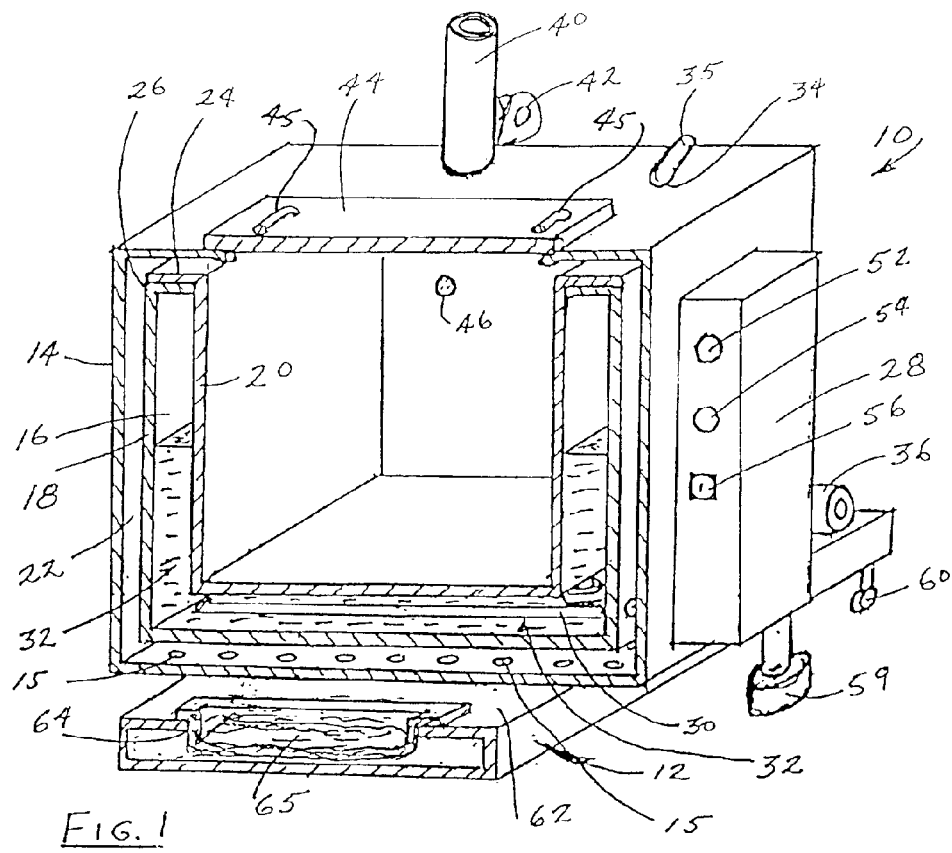
FIG. 1 is a partial isometric view of the preferred embodiment of this invention, taken on line 1—1 of FIG. 2 and showing the essential structure of a wastewater treatment apparatus according to the invention.
Figure 2:
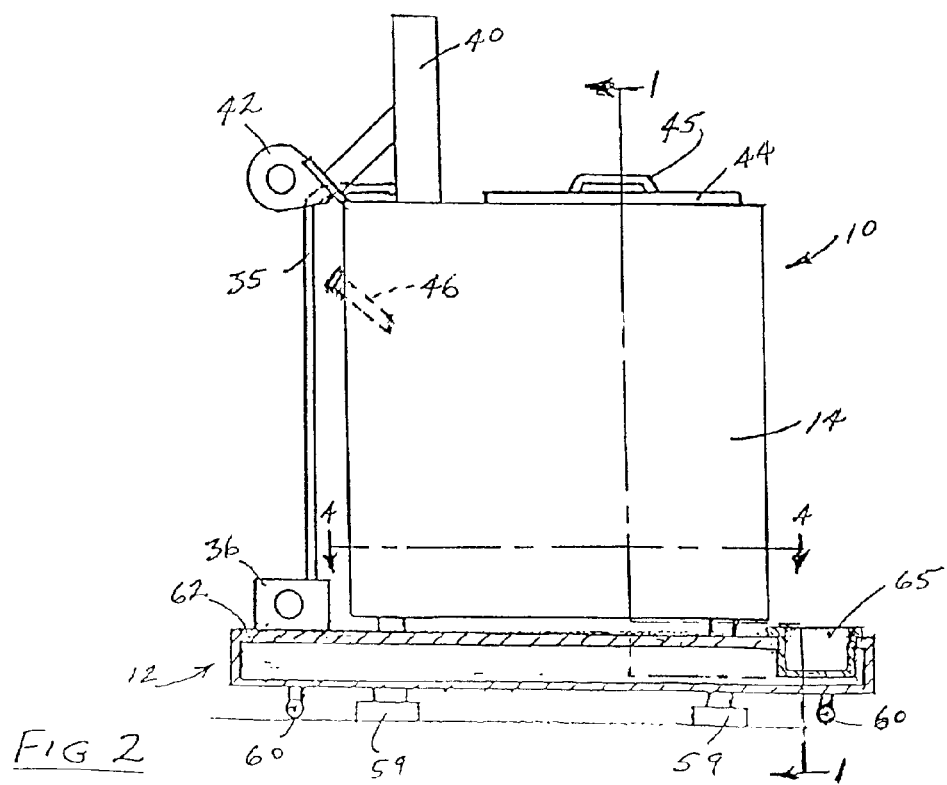
FIG. 2 is a side view of the preferred embodiment of the apparatus as shown in FIG. 1, with the wastewater tray shown in partial cross section.
Figure 3:
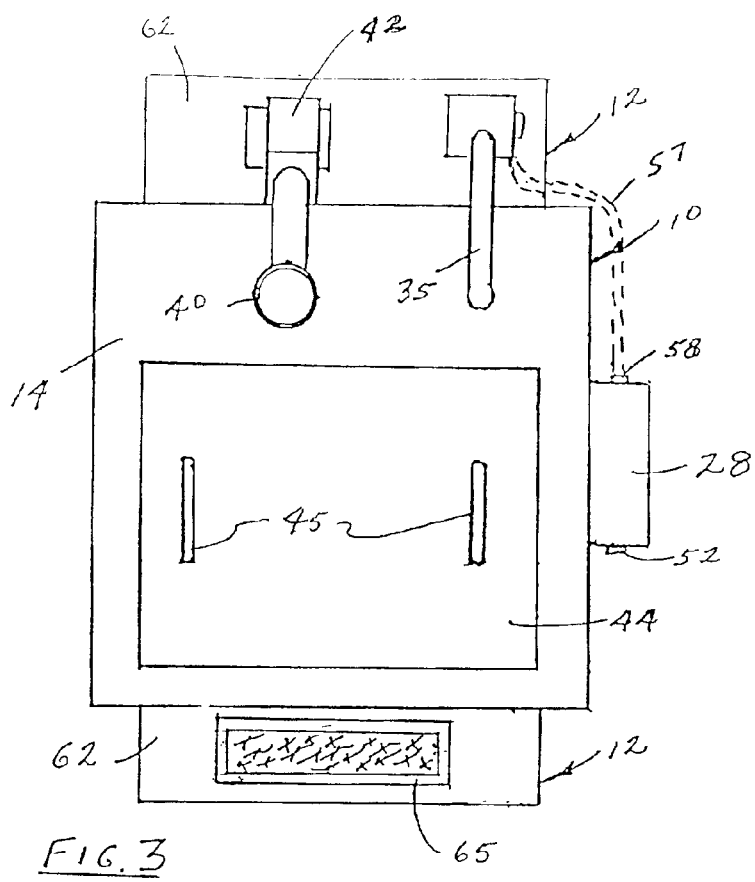
FIG. 3 is a top view of the embodiment of FIGS. 1 and 2.

Referring to FIG. 1, a preferred embodiment of the present invention comprises a wastewater treatment apparatus 10 and an optional separate wastewater receiving tank 12. Apparatus 10 includes an external jacket 14 substantially cubic in shape. Contained inside and spaced from jacket 14 is an interior heat generating chamber 16 (e.g., 4 inches wide at its four sides and 6 inches at its bottom) which is defined at its outside by a heating vessel 18 (e.g., 10 gauge steel) having side walls and a bottom wall as shown, and on the inside by a fluid (e.g., wastewater) receiving vessel 20 preferably of titanium or stainless steel (e.g., about 24 inches in all three dimensions and 15½ gauge). Heating vessel 18 in turn is spaced from outer jacket 14 by an air space 22 (e.g., about 2 inches in width on all four sides and at its top and bottom) to insulate jacket 14. Although not shown, heating vessel 18 may be supported at its bottom by jacket 14 using vertical posts or the like. The bottom of jacket 14 also contains a number of spaced vent holes 15 to admit ambient air into air space 22 both to keep jacket 14 cool to touch and to create air flow to facilitate vapor exhaust.

Fluid receiving vessel 20 as shown includes side walls, a bottom wall and at least a partially open top. Fluid vessel 20 in turn is supported by heating vessel 18 by outwardly extending (e.g., 4 inch) flanges 24 at the top of all four sides sitting atop similar, inwardly extending flanges 26 at the top of all four sides of heating vessel 18. As thus shown in FIGS. 1 and 4, heating chamber 16 extends across the bottom wall and the height of the side walls of fluid vessel 20. Vessels 18 and 20 may be welded together by their respective flanges, but preferably are held together by detachable means such as stainless steel bolts to enable vessel 20 to be readily removed for maintenance of heating chamber 16 and the heating elements to be described.

Figure 4:
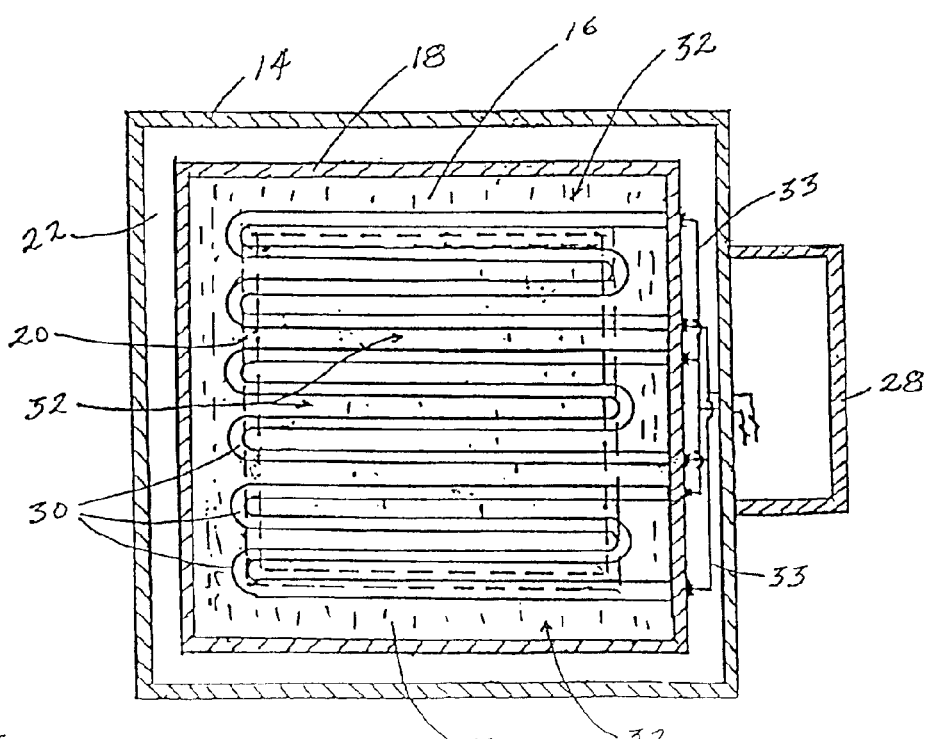
FIG. 4 is a cross sectional view taken on line 4—4 of FIG. 2.

Within heating chamber 16 and below vessel 20 as shown in FIG. 4 are a 10 kilowatt array of preferably three serpentine electric heating elements 30 (e.g., flat bar stock with 8 watts per square on 5½ inch centers between bars), the electrical power to which is provided by leads 33 as shown in FIG. 4 to a control panel 28. In addition, heating chamber 16 is substantially filled (e.g., about one half the depth of chamber 16) with about 50 gallons of a non-toxic, heat transfer liquid mineral oil 32 such as PARATHERM NF Heat Transfer Fluid supplied by Paratherm Corporation of Conshocken, Pa., to evenly distribute to vessel 20 the heat generated by heating elements 30 and causing the wastewater contained in the fluid vessel to boil and evaporate while enabling the contaminates in the wastewater to settle in vessel 20 in concentrated form for later disposal. Also as shown in FIGS. 1 and 4, heat transfer oil 32 fills at least the entire bottom and a substantial portion of the sides of heating chamber 16. Such a mineral oil can be heated up to 600° F., which on being so heated begins to circulate convectively to carry the heat to the fluid receiving vessel.

The wastewater is delivered to vessel 20 by an inlet 34 connected by a pipeline or flexible hose 35 and self priming pump means 36 to a suitable supply tank such as tank 12 as shown. Water vapor as it is generated escapes from vessel 20 in the apparatus with an air flow from space 22 by exhaust pipe 40 which preferably includes an exhaust blower fan 42 to facilitate the air flow and exhaust. There also is preferably provided a removable access cover 44 that may be lifted off by handles 45 as shown to expose the inside of vessel 20 through at least a partially open top for inspection and routine maintenance, and may also be available for hand filling of wastewater from pails and the like. At the rear of vessel 20 is an access pipe 46 extending through both jacket 14 and vessel 18 and opening into vessel 20 to enable the insertion of a hose to pump out any contaminate concentrated water remaining in the apparatus for suitable disposal. Pipe 46, which may include a removable cap on its outer side, preferably is angled, for example at 45 degrees, to enable the inserted hose to be extended to the bottom of vessel 20.

Power to operate apparatus 10 is supplied to the control panel 28 mounted at the side of jacket 14 as shown, with the electrical power delivered through a suitable 3-prong plug from any 220 volt receptacle. The control features may include those described in my patent, but may also simply comprise a "dead man" switch 52 to power supply pump 36 only while switch 52 is actively held in its closed position by the operator, a combined start-stop 24-hour timer control 54 to start and shut off the electrical power at selectable times, and a "HI-LO" switch 56 to select alternative high and low heat settings of, for example, 350° F. and 150° F., respectively.

Further as shown, apparatus 10 is supported by suitable legs 59, which preferably are adjustable in height and may include lockable casters for easy movement.

The removable wastewater supply tank 12 (e.g., about 24 inches wide and 4 inches high to enable a direct fill from the drain of a power scrubber preferably extends beyond apparatus 10 (say 10 inches at each end) and is mounted on casters 60 to enable the tank 12 to be moved out from under apparatus 10. The top wall 62 of tank 12 includes an access opening through which wastewater is dumped into a removable filter tray 65 placed in tank 12, and supply pump 36 which is mounted on a bracket detachable from top wall 62 (to enable pump 36 to be used with other wastewater supply means) connected by the flexible, detachable hose 35 to inlet 34. The example size of tank 12 is sufficient to hold wastewater from a 50 gallon power scrubber. The power cord 57 for pump 36 may conveniently be plugged into a twist lock receptacle 58 in control panel 28 to operate the pump from the control panel. Filter tray 65 is removable and disposable filter bag into which the waste water is poured to filter out larger particles in the wastewater. Filter tray 65 may be made of any suitable close mesh material such as a polyester which when full can be removed and incinerated or otherwise properly disposed along with its filtered contents.

Pump 36 may alternatively be mounted directly on the back wall of jacket 14. If desired, or if necessary because of local environmental regulations, the evaporating discharge pipe 40 can be connected to a conventional water condenser coil (not shown) to collect distilled water for reclaiming and reuse as washwater.

In operation, the apparatus is first filled with wastewater generated by a floor scrubber of the like, either by hand or through supply tank 12 by holding pump switch 52 closed until vessel 20 is filled to an appropriate level. The preferred heating level is then set on HI-LO switch 56 and the timer control 54 then set both to close the heating circuit for the selected time and to actuate blower fan 42 causing the wastewater to reach its boiling temperature, evaporate the water and expel the water vapor from the apparatus. When the water is substantially evaporated, the remaining waste is then removed from vessel 20 through pipe 46 or cover 44.

Figure 5:
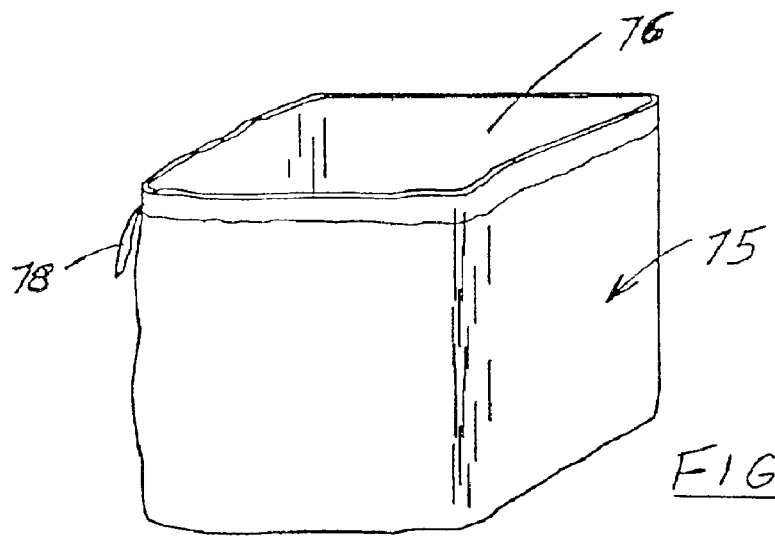
FIG. 5 illustrates the liner of the present invention.
Figure 6:
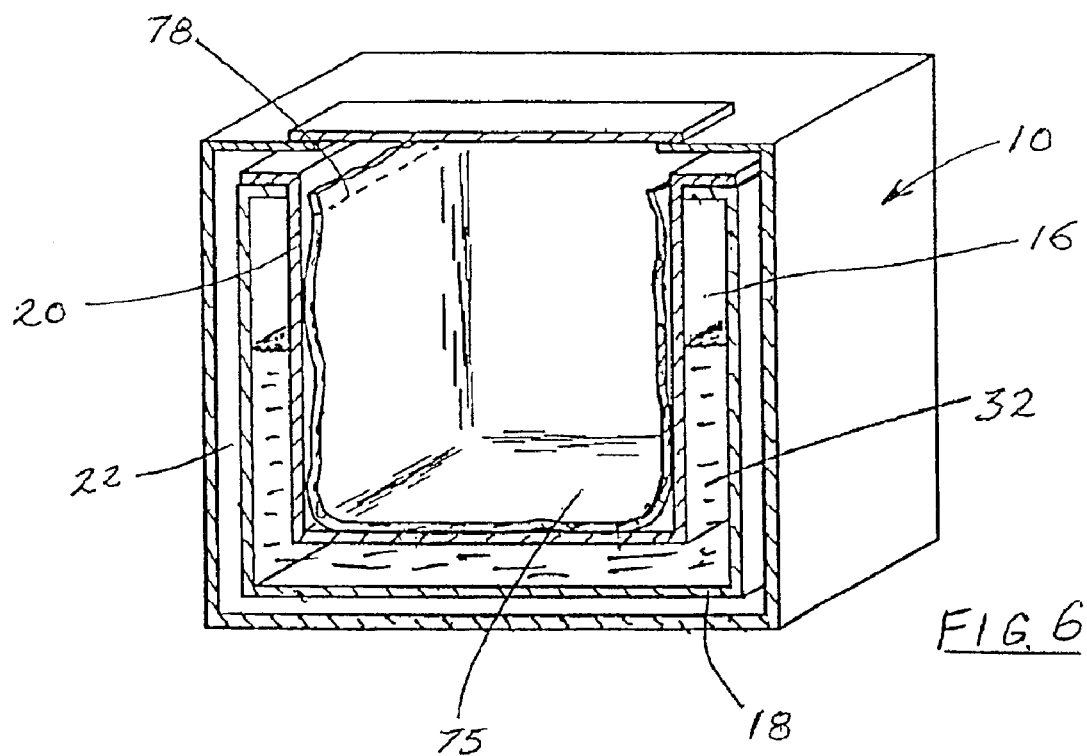
FIG. 6 is a partial isometric view of the wastewater treatment apparatus, in cross-section, with the liner of the present invention shown in working position in the fluid receiving vessel.

Referring now to FIGS. 5 and 6, an alternate embodiment of the present invention comprises a disposable liner 75, made of a material which is waterproof and both nonporous and impervious with respect to the expected content of contaminants in the wastewater, and which is further capable of withstanding heat up to about 450° F., for example a 32 oz. silicone rubber coated, fiberglass woven fabric identified as G32SIL and manufactured by Amatex Corporation of Norristown, Pa.

Liner 75 is fabricated so as to prevent the through-passage of water and waste, the sides and bottom of liner 75 conforming in its outer shape to the contours of the fluid receiving vessel 20 of the wastewater treating apparatus. Liner 75 has at least one closeable opening 76 at its top to admit unprocessed wastewater from any source and vent evaporating water during operation to reduce the nonvolatile contaminates to their dry state. Liner 75 is formed of sufficient material at its top to be capable of being sealed shut and removed from fluid receiving vessel 10 and disposed, for example by incineration, along with the residue. The closure may consist of draw string 78 as shown or other suitable means such as adhesive tape.

If the temperature difference between the heating elements and the oil exceeds certain limits, the efficiency of the heat transfer from heating elements to oil is reduced, due in part to radiative and conductive cooling through the external walls of the heating chamber containing the oil and the heating elements, and due in part to variations in convective behavior of the oil at different temperature ranges and viscosities. Consequently, a means is described whereby the relative difference between the oil temperature and the heating element temperature may be held within such limits as will promote a maximally efficient transfer of heat to the oil and energy savings. This means also contributes to the useful life of the heating elements and the heat transfer fluid.

To accomplish the foregoing, an alternate embodiment of the invention includes the incorporation of a pair of thermally-activated sensors, one immersed in the oil in the heating vessel and not touching other surfaces or substances, and the other also immersed in the oil but attached directly to the surface of at least one heating element. The sensors are interconnected in the electrical circuit so that when the temperature difference between the oil and the heating element exceeds a certain preset limit electrical current, the heating element is turned off.

Figure 7:
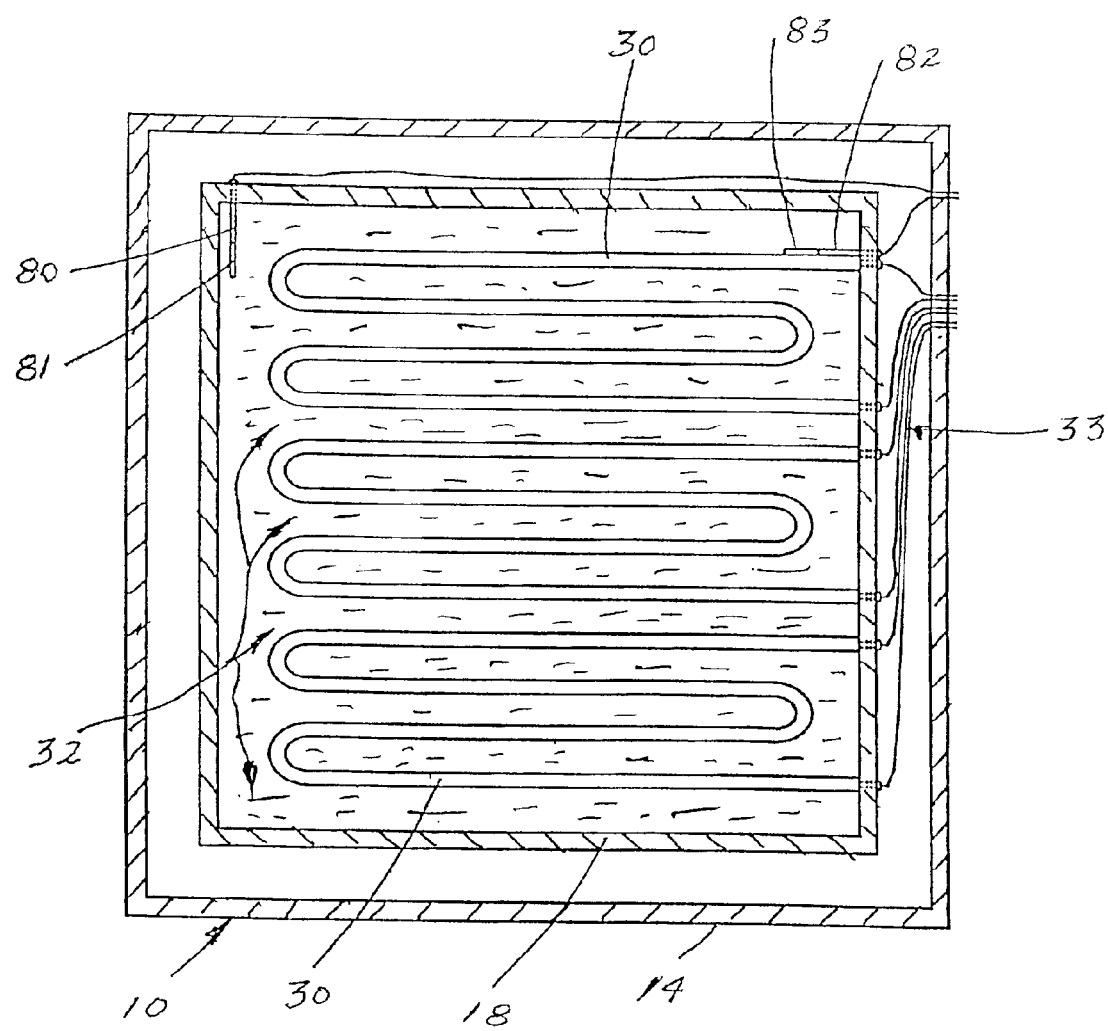
FIG. 7 shows a cross-sectional view of the apparatus, illustrating the relative positions in the heating vessel of the oil temperature sensor and the heating element temperature sensor.

To control the heating circuit as described and as shown in FIG. 7, a pair of thermally-activated sensors or thermocouples 80 and 82, for example sensor type Rapidship MI manufactured by Watlow-Gordon of Richmond, Ill. connected to the heating element power circuit 85, the thermal sensor element 81 of sensor 80 suspended in oil 32 in heating vessel 18, and the thermal sensor element 83 of sensor 82 mounted against the surface of a heating element 30 in heating vessel 18.

Thermally-activated sensors 80 and 82 are connected to heating control circuit 85 of any type, an example of which is shown in FIG. 8, which detects a difference in temperature between the two sensors and changes the state of a power-circuit switching means depending on the relationship between that difference and a set value, e.g.:

| Condition | Action |
|---|---|
| Difference less than set value | Close switching means to heat elements 30 |
| Difference exceeds set value | Open switching means to open circuit to heating elements 30 |

A suitable preset value may be about 30° F. such that the switching means is closed if the temperature difference is less than that amount and open if more than that amount. Heating elements 32 in heating vessel 18 are supplied power through a power-circuit switching means as described above and illustrated in FIG. 8. When the starter button of apparatus 10 is first closed, the switching means is closed to begin heating the heating elements 30 and raise the temperature of the heat transfer fluid 32 sufficient to cause wastewater in vessel 20 to be evaporated. However, as the transfer fluid 32 is being heated, the temperature of the heating elements 30 will continue to rise even faster and cause temperature gradients to occur within the transfer fluid 50. The temperature probes 80, 82 are provided to limit the temperature differential. Consequently, when a difference in temperature between thermally-activated sensors 81 and 83 exceeds a set value, the heating circuit 85 will cut off power to heating elements 30 until the temperature of heating elements 30 drops to a level at which the temperature differential is less than the set value. At that time, the difference in temperature between thermally-activated sensors 81 and 82 which does not exceed the set value will allow power to flow to heating elements 30 and cause the switching means to close and to continue heating the heat transfer fluid 32. This more energy efficient cycle continues until the heat transfer fluid 32 reaches and is maintained at its preset operating temperature to cause evaporation of the wastewater. The operation may continue by adding more wastewater as desired. When a sufficient amount of contaminants has been collected, the apparatus 10 preferably is operated until all of the remaining wastewater is evaporated leaving a dry residue of the contaminants in liner 75 for disposal by an environmentally safe means.

From the description above, it should be clear that the present invention offers significant savings in labor, reduction of contamination risk, and energy savings. For example, an apparatus according to the invention may only need about 10–12 amps to operate as opposed to about 40–41 amps. The use of a removable liner which may either be cleaned or disposed of substantially reduces the cleaning effort required for the apparatus. The use of the described temperature-difference control for the heating vessel reduces the waste of energy used in heating, and further adds to the useful life of the heat transfer fluid 32 and heating elements 30. It also may provide a degree of safety in case of heating vessel leakage or other abnormal condition.

It is to be understood that the aforementioned description is illustrative only and that changes can be made in the apparatus, in its components and their functions, without departing from the scope of the invention as defined in the following claims.

I claim:

1. A compact, self-contained and moveable apparatus for treating wastewater containing a substantial volume of water and substantially less amounts of, at water boiling points, non-volatile contaminants, the apparatus comprising:

(a) a fluid vessel to collect wastewater and having a bottom wall, side walls and at least a partially open top, (b) means for delivering wastewater to the fluid vessel, (c) a heating vessel surrounding and spaced from at least the side walls and the bottom wall of the fluid vessel to form with the fluid vessel side walls and bottom wall an interior heating chamber between the heating vessel and the fluid vessel comprising a bottom space extending across the bottom wall of the fluid vessel and side spaces extending the height of the side walls of the fluid vessel, (d) a heat transfer liquid having a boiling point substantially in excess of the boiling point of the collected wastewater and filling at least the bottom space and a substantial portion of the side spaces of the heating chamber around the fluid vessel side walls and bottom wall, (e) heating means positioned in the heating chamber for generating heat sufficient to vaporize substantially entirely the wastewater and form water vapor, the heating means immersed in the heat transfer liquid by which heat generated by the heating means is transferred to the fluid vessel side walls and bottom wall to heat the collected wastewater until substantially entirely vaporized and leaving a dry residue of the contaminants in the fluid vessel, (f) means connected to the heating element for activating the heating means to heat the heat transfer liquid, (g) an outer jacket substantially surrounding the heating vessel and spaced from the heating vessel to define an insulating space between the jacket and heating vessel, (h) vapor exhaust means for expelling the water vapor from the fluid vessel, and (i) the apparatus further comprising control means for maintaining the temperature of the heat transfer liquid within a predetermined range as the collected wastewater is being vaporized.

2. Apparatus for treating wastewater according to claim 1, wherein the heat transfer liquid is a mineral oil heatable to a temperature of 600 F.

3. Apparatus for treating wastewater according to claim 1 and further comprising means for causing ambient air to flow through the insulating space to facilitate vapor exhaust and to cool the outer jacket.

4. Apparatus for treating wastewater according to claim 1 and further comprising a movable wastewater supply tank positioned under the outer jacket for supplying wastewater to the delivering means, the tank including means for filtering larger particles from the wastewater before delivery to the fluid vessel.

5. Apparatus for treating wastewater according to claim 1 and further comprising a disposable liner made of a waterproof and nonporous material insertable into and lining the vessel and receiving the wastewater, the wastewater contained in the liner being evaporated and leaving the dry residue of contaminants in the liner to be disposed of with the liner.

6. The apparatus according to claim 5 in which the liner comprises a silicone rubber coated, fiberglass woven fabric capable of withstanding heat to about 450° F.

7. Apparatus for treating wastewater according to claim 1, wherein the delivery means, the heating means and the vapor exhaust means are electrically operated, and further comprising electrical circuit means for providing electrical power and a switch box accessible to an operator and containing electrical switches to set the operating temperature of the heat transfer liquid and the time of operation of the heating means and vapor exhaust means.

8. Apparatus for treating wastewater according to claim 1, wherein the control means further maintaining the temperatures of the heating means within a predetermined range of values as the collected wastewater is being heated by activating the heating means when the temperature of the heating means exceeds the temperature of the heat transfer liquid by less than a preset value and deactivating the heating means when the temperature difference is greater than the preset value.

9. A compact, self-contained and moveable apparatus for treating wastewater containing a substantial volume of water and substantially lesser amounts of, at water boiling points, non-volatile contaminants, the apparatus comprising:

(a) a fluid vessel to collect wastewater and having a bottom wall side walls and at least a partially open top, (b) means for delivering wastewater to the fluid vessel, (c) a heating vessel surrounding and spaced from at least the side walls and the bottom wall of the fluid vessel to form with the fluid vessel side walls and bottom wall an interior heating chamber between the heating vessel and the fluid vessel comprising a bottom space extending across the bottom wall of the fluid vessel and side spaces extending the height of the side walls of the fluid vessel, (d) a heat transfer liquid having a boiling point substantially in excess of the boiling point of the collected wastewater and filling at least the bottom space and a substantial portion of the side spaces of the heating chamber around the fluid vessel side walls and bottom wall, (e) a heating element positioned in the heating chamber to generate heat sufficient to vaporize the wastewater and form water vapor, the heating element immersed in the heat transfer liquid by which heat generated by the heating element is transferred to the fluid vessel side walls and bottom wall to heat the collected wastewater until it is vaporized, (f) means connected to the heating element for activating the heating element to heat the heat transfer liquid, (g) an outer jacket substantially surrounding the heating vessel and spaced from the heating vessel to define an insulating space between the jacket and heating vessel, and (h) vapor exhaust means for expelling the water vapor from the fluid vessel, (i) wherein the delivery means, the heating element and the vapor exhaust means are electrically operated, and further comprising electrical circuit means for providing electrical power and a switch box accessible to an operator and containing electrical switches to set the operating temperature of the heat transfer liquid and the time of operation of the heating element and vapor exhaust means.

10. A compact, self-contained and moveable apparatus for treating wastewater containing a substantial volume of water and substantially lesser amounts of, at water boiling points, non-volatile contaminants, the apparatus comprising:

(a) a fluid vessel to collect wastewater and having a bottom wall side walls and at least a partially open top, (b) means for delivering wastewater to the fluid vessel, (c) a heating vessel surrounding and spaced from at least the side walls and the bottom wall of the fluid vessel to form with the fluid vessel side walls and bottom wall an interior heating chamber between the heating vessel and the fluid vessel comprising a bottom space extending across the bottom wall of the fluid vessel and side spaces extending the height of the side walls of the fluid vessel, (d) a heat transfer liquid having a boiling point substantially in excess of the boiling point of the collected wastewater and filling at least the bottom space and a substantial portion of the side spaces of the heating chamber around the fluid vessel side walls and bottom wall, (e) a heating element positioned in the heating chamber to generate heat sufficient to vaporize the wastewater and form water vapor, the heating element immersed in the heat transfer liquid by which heat generated by the heating element is transferred to the fluid vessel side walls and bottom wall to heat the collected wastewater until it is vaporized, (f) means connected to the heating element for activating the heating element to heat the heat transfer liquid, (g) an outer jacket substantially surrounding the heating vessel and spaced from the heating vessel to define an insulating space between the jacket and heating vessel, and (h) vapor exhaust means for expelling the water vapor from the fluid vessel, (i) the apparatus further comprising control means for maintaining the temperatures of the heat transfer liquid and the heating element within a predetermined range of values as the collected wastewater is being heated by activating the heating element when the temperature of the heating element exceeds the temperature of the heat transfer liquid by less than a preset value and deactivating the heating element when the temperature difference is greater than the preset value.

11. The apparatus according to claim 10, wherein the control means comprises at least a first temperature sensor measuring the temperature of the heat transfer liquid and at least a second temperature sensor measuring the temperature of the heating element, and means responsive to the temperatures sensed by the temperature sensors for activating the heating of the heating element when the difference in the temperatures of the heat transfer liquid and the heating element is less than the preset value and deactivating the heating element when the temperature difference is greater than the preset value.

12. Apparatus for treating wastewater according to claim 10, wherein the heat transfer liquid is a mineral oil heatable to a temperature of 600 F.

13. Apparatus for treating wastewater according to claim 10 and further comprising means for causing ambient air to flow through the insulating space to facilitate vapor exhaust and to cool the outer jacket.

14. Apparatus for treating wastewater according to claim 10 and further comprising a movable wastewater supply tank positioned under the outer jacket for supplying wastewater to the delivering means, the tank including means for filtering larger particles from the wastewater before delivery to the fluid vessel.

15. Apparatus for treating wastewater according to claim 10 and further comprising a disposable liner made of a waterproof and nonporous material insertable into and lining the vessel and receiving the wastewater, the wastewater contained in the liner being evaporated and leaving a residue of contaminants contained in the liner to be disposed of with the liner.

16. The apparatus according to claim 15 in which the liner comprises a silicone rubber coated, fiberglass woven fabric capable of withstanding heat to about 450° F.

17. A compact, self-contained and moveable apparatus for treating wastewater containing a substantial volume of water and substantially lesser amounts of, at water boiling points, non-volatile contaminants, the apparatus comprising:

(a) a fluid vessel to collect wastewater and having at least a partially open top wall, side walls and a bottom wall,
   (b) means for delivering wastewater to the fluid vessel,
   (c) a heating vessel surrounding and spaced from at least the side walls and the bottom wall to form an interior heating chamber between the heating vessel and the fluid vessel,
   (d) a heating element positioned in the heating chamber to generate heat sufficient to vaporize the wastewater and form water vapor,
   (e) a heat transfer liquid having a boiling point substantially in excess of the boiling point of the collected wastewater and filling at least a substantial portion of the heating chamber and immersing the heating element to transfer heat generated by the heating element to the fluid vessel walls to heat the collected wastewater until it is vaporized,
   (f) an outer jacket substantially surrounding the heating vessel and spaced from the heating vessel to define an insulating space between the jacket and heating vessel,
   (g) vapor exhaust means for expelling the water vapor from the fluid vessel, and
   (h) control means for maintaining the temperatures of the heat transfer liquid and the heating element within a predetermined range of values as the collected wastewater is being heated by activating the heating element when the temperature of the heating element exceeds the temperature of the heat transfer liquid by less than a preset value, the control means comprising at least a first temperature sensor measuring the temperature of the heating element, and means responsive to the temperatures sensed by the temperature sensors for activating the heating of the heating element when the difference in the temperatures of the heat transfer liquid and the heating element is less than the preset value and deactivating the heating element when the temperature difference is greater than the preset value, the first temperature sensor being suspended in the heat transfer liquid and spaced from the heating element and the walls defining the heating chamber, and the second temperature sensor being in contact with the heating element.

* * * * *